April 18, 1967 A. S. WHITEHILL 3,314,631
RESILIENT MOUNTING SYSTEM

Filed Feb. 19, 1965

2 Sheets-Sheet 1

INVENTOR.
Albert S Whitehill
BY Ralph Hammar
Attorney

United States Patent Office 3,314,631
Patented Apr. 18, 1967

3,314,631
RESILIENT MOUNTING SYSTEM
Albert Simeon Whitehill, Erie, Pa., assignor to Lord Corporation, a corporation of Pennsylvania
Filed Feb. 19, 1965, Ser. No. 433,888
5 Claims. (Cl. 248—18)

This invention is a resilient mounting system which produces a high degree of vibration isolation by resiliently supporting the equipment to be protected on an intermediate mass substantially in the plane of the center of gravity of the supported equipment and in turn resiliently supporting the intermediate mass on a base. The resilient supporting structure for the supported equipment and for the intermediate mass is centered on the plane of the center of gravity of the supported equipment, thereby suppressing rocking modes and providing effective isolation in all directions.

Figure 1:
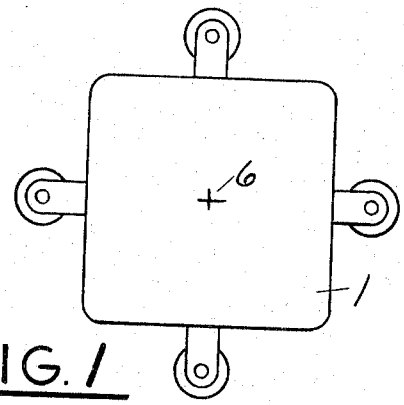
Figure 2:
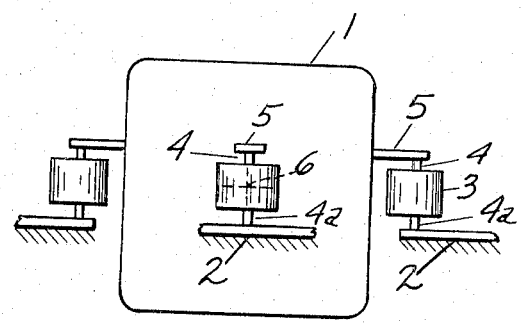
Figure 3:
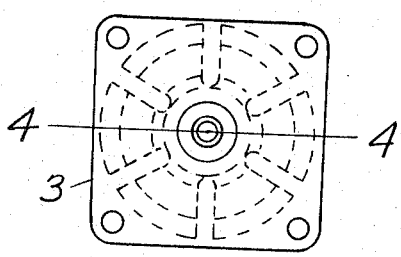
Figure 6:
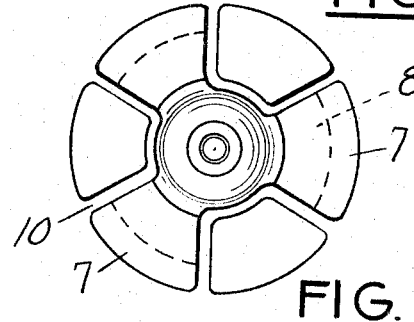
Figure 5:
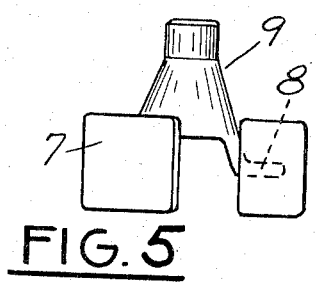
Figure 4:
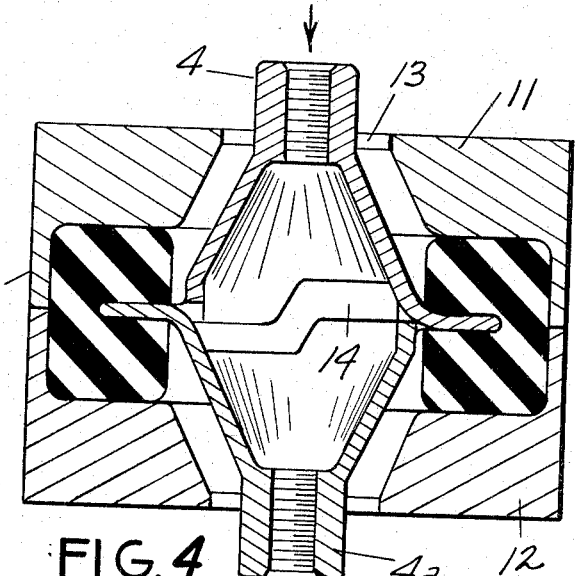
Figure 7:
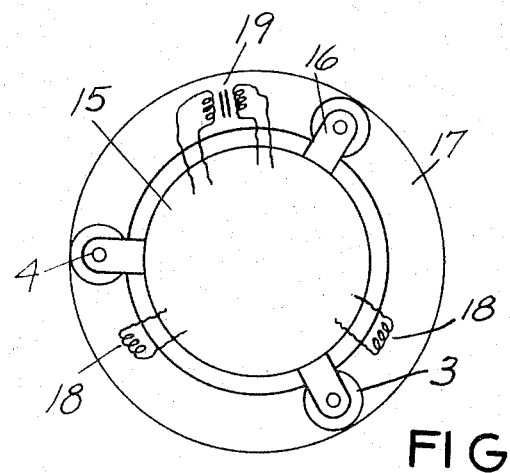
Figure 8:
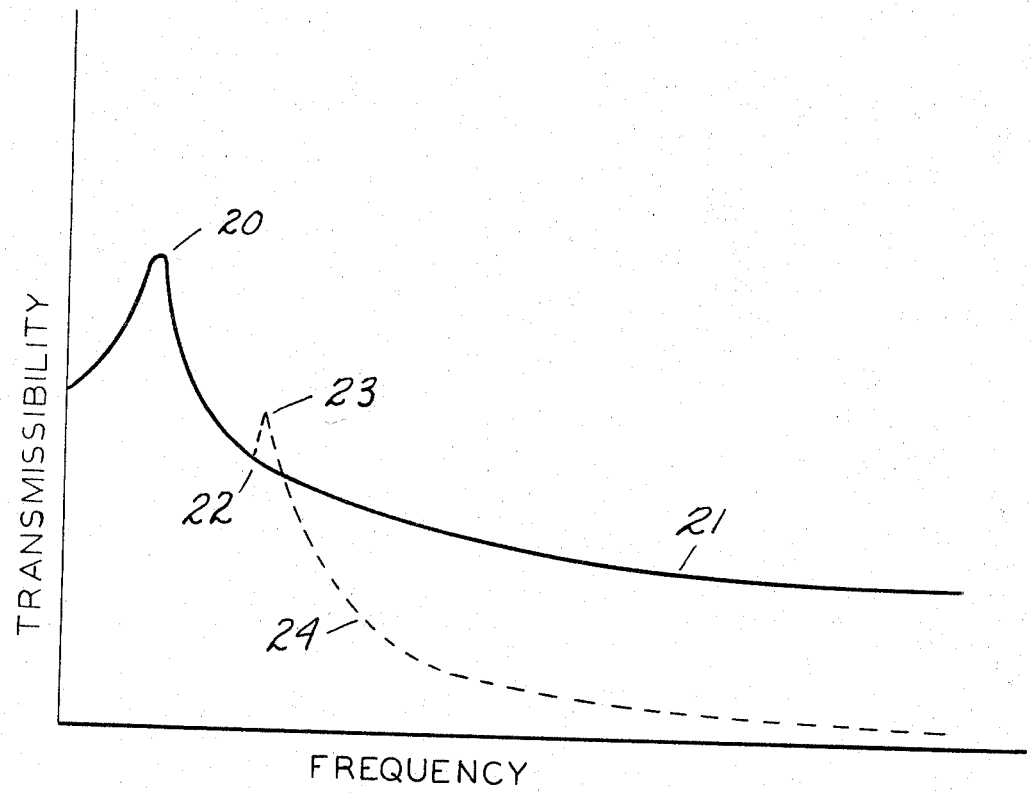

In the drawing, FIG. 1 is a diagrammatic top plan view of the resilient mounting system, FIG. 2 is a side elevation of the mounting system, FIG. 3 is a top plan view of one of the resilient mountings, FIG. 4 is a section on line 4—4 of FIG. 3, FIG. 5 is an elevation of one of the elements of the resilient mounting, FIG. 6 is a top plan view of the FIG. 5 element with the associated element nested in place, FIG. 7 is a top plan view of a modification, and FIG. 8 is a performance diagram.

In the drawing, 1 indicates diagrammatically the equipment to be protected from destructive vibration and 2 indicates the supporting structure. Between the equipment and the supporting structure are arranged three or more resilient mountings 3, each mounting having a load receiving member 4 connected to a load carrying element such as a bracket 5 on the equipment 1 and a load transmitting member 4a connected to the supporting structure 2. The mountings 3 are spaced from and distributed about the center of gravity 6 of the equipment 1 and are arranged substantially in a horizontal plane through the center of gravity. The purpose is to prevent rocking of the equipment 1 relative to the supporting structure 2 so that translational vibrations in all directions are effectively isolated.

The resilient element of the mounting system is made of two identical parts shown in FIGS. 5 and 6, each having three (or more) equally spaced sections 7 of rubber or other elastomer bonded to a radially projecting arm 8 projecting from a hub or stem 9. These parts are assembled end to end, as shown in FIG. 4, and when assembled, the elastomeric sections 7 interfit or nest together with a slight space 10 between the sections 7 as shown in FIG. 6. The nested parts are held together in the housing comprising metal parts 11 and 12 which are suitably secured together, for example by bolting at the corners. The metal parts 11 and 12 have a substantial mass which enters into and improves the performance of the mounting system. If the housing parts 11 and 12 were merely required to hold the elastomeric parts 7 together, the housing would be of much lighter weight.

Vibrations acting on the supporting structure 2 which are to be isolated from the supported equipment 1 can be resolved into vertical and horizontal forces acting through the center of gravity 6 of the supported equipment. The vertical or axial forces are transmitted from the base 2 by the stem 4a and transmitted in compression stress through the elastomeric sections 7 to the housing 11, 12. From the housing the vertical forces are transmitted in compression through the elastomeric sections 7 associated with the stem 4 to the bracket 5 on the supported equipment. It will be noted that for a vertical force to get through to the supported equipment, it must pass through two sets of elastomeric elements in series. As is evident from FIG. 4, there is sufficient clearance between the stems 4 and 4a and the housing as indicated at 13 and between the stems as indicated at 14 so that direct metal to metal contact is avoided. Horizontal or radial forces in any direction are transmitted from the stem 4a through the elastomeric elements 7 to the housing and from the housing to the elastomeric elements 7 associated with the stem 4. Again, the forces must pass through two elastomeric elements in series and there is adequate clearance to prevent direct metal to metal contact between the stems 4, 4a and the housing.

Because the housings 11, 12 have a mass which is a substantial fraction of the weight of the supported equipment 1, for example, a mass of 5–10% of the mass of the supported equipment, the housing mass enters into the vibration isolation. If the housings had negligible mass, the vibration isolation would be equivalent to that of a single elastomeric element having the stiffness of the two elastomeric elements in series. This would produce some improvement but it would be relatively small or fractional at the vibration frequencies for which the system is designed. However, by making the housings of substantial mass, the vibration isolation can be effectively doubled. There is no advantage in increasing the housing mass above 5–10% of the mass of the supported equipment. The operation is not correspondingly improved by the additional dead weight.

The mounting system is substantially unaffected by forces tending to produce angular motion of the supported equipment. One reason for this is that the individual mounting units as shown in FIG. 1 are located a substantial distance from the center of gravity of the supported equipment and therefore have a substantial moment arm for resisting angular motion of the equipment about its center of gravity. Another reason for the resistance is that the elastomeric elements 7 are nested so that the elements effectively act substantially in a horizontal plane through the center of gravity. This eliminates reactions or coupling which could produce rocking of the supported equipment.

From one aspect, the housings 11, 12 are isolated from vibrations originating in the base 2 by the elastomeric sections 7 associated with the stem 4a and the equipment 1 is further isolated from vibrations of the housings by the elastomeric sections associated with the stem 4. Because the housings have about half the vibration isolation given the equipment 1, it is possible to include some of the less sensitive equipment in the housings. For example, in the case of electronic equipment 1, more rugged components such as transformers and coils might be mounted in or on the housings and connected by flexible leads to the balance of the equipment 1. This would provide the desired mass for the housings without increasing the over-all weight. FIG. 7 shows diagrammatically electronic equipment 15 having brackets 16 connected to hubs 4 of the resilient mountings previously described. The housings of the mountings 3 are of sufficient strength to contain the elastomeric elements. The desired added mass of the housings comes from a connecting ring or frame 17 and coils 18 and a transformer 19 connected by flexible leads to the equipment 15. The mode of operation is unchanged.

FIG. 8 compares the performance of this mounting system with a simple mounting system in which the supported equipment is supported directly on the base by a single spring. In the simple mounting system, the transmissibility of vibration starts at 100% at zero frequency, reaches a peak 20 as the vibration frequency equals the natural frequency of vibration of the equipment 1 on the supporting spring. As the vibration frequency increases, the transmissibility falls off along curve 21. In the mounting system of FIGS. 1–7, the transmissibility of vibration to the equipment 1 starts at 100% at zero frequency and rises to the peak 20 at which the vibration frequency equals the natural frequency of vibration of the equipment 1 on the mountings 3. For purposes of comparison this natural frequency is the same as for the simple mounting system. As the vibration frequency increases, the transmissibility drops off along curve 21 until the frequency approaches the natural frequency of vibration of the housings 11, 12 relative to the base 2. At this point designated by numerals 22 as the vibration frequency increases, the transmissibility increases to peak 23 and then falls off along dotted line 24. Note, at the higher frequencies, the vibrations are almost completely isolated from the equipment 1. For the frequencies of dotted line 24, the housing 11, 12 vibrates at about half the amplitude of the supporting structure 1. That is, about half of the vibration is isolated from the housing 11, 12. The same would be true of the ring 17 in FIG. 7.

What is claimed as new is:

1. In a resilient mounting system, equipped having load carrying elements distributed around and spaced radially outward from the center of gravity of the equipment, a supporting structure, a plurality of mountings each arranged between said supporting structure and one of said load carrying elements, said mountings each comprising a first hub connected to said supporting structure, a second hub coaxial with the first hub connected to one of said load carrying elements, each hub having at least three angularly spaced radially projecting arms substantially in the same plane, the arms of the first hub being interleaved and nested between the arms of the second hub, an elastomeric element fixed to each arm and having upper and lower ends above and below and outer surfaces radially outward of each arm, said elastomeric elements also being interleaved and nested together and spaced from each other, and a housing surrounding and connected in load transmitting relation to said elastomeric elements and spaced from said arms and hubs, the total mass of said housings being a substantial fraction of the mass of the equipment.

2. In a resilient mounting system, equipment having load carrying elements distributed around and spaced radially outward from the center of gravity of the equipment, a supporting structure, a plurality of mountings each arranged between said supporting structure and one of said load carrying elements, said mountings each comprising a first hub connected to said supporting structure, a second hub coaxial with the first hub connected to one of said load carrying elements, each hub having at least three angularly spaced radially projecting arms substantially in the same plane, the arms of the first hub being interleaved and nested between the arms of the second hub, an elastomeric element fixed to each arm and having upper and lower ends above and below and outer surfaces radially outward of each arm, said elastomeric elements also being interleaved and nested together and spaced from each other, and a housing surrounding and having upper and lower walls respectively engaging the upper and lower ends of said elastomeric elements and having a peripheral wall engaging the outer surface of said elastomeric elements.

3. A resilient mounting having a first member adapted to be connected to equipment to be supported, a second member adapted to be connected to a supporting structure, said members each having at least three parts respectively interleaved in spaced relation to each other and in substantially the same plane, an elastomeric element fixed to each part of the first member, an elastomeric element fixed to each part of the second member, said elastomeric elements cushioning motion in axial and radial directions, and a third member connected in load transmitting relation from each elastomeric element fixed to a part of the first member to each elastomeric element fixed to a part of the second member.

4. In a resilient mounting system, equipment having a plurality of load carrying elements distributed around and spaced radially outward from the center of gravity of the equipment, a supporting structure, a plurality of mountings each having a load receiving element connected to a load carrying element and a load transmitting element connected to the supporting structure, the load carrying and load receiving elements having parts interleaved in spaced relation to each other and in substantially the same plane, an elastomeric element fixed to each part of the load receiving element, an element of elastomer fixed to each part of the load transmitting element, said elastomeric elements cushioning motion in axial and radial directions, and a member connected in load transmitting relation from each elastomeric element fixed to a part of a load receiving element to each elastomeric element fixed to a part of a load transmitting element, the mass of said member being a substantial fraction of the mass of the equipment.

5. In a resilient mounting system, equipment having a plurality of load carrying elements distributed around and spaced radially outward from the center of gravity of the equipment, said equipment having associated components having a mass equal to a substantial fraction of the total mass of the equipment, a supporting structure, a plurality of mountings each having a load receiving element connected to a load carrying element and a load transmitting element connected to the supporting structure, the load carrying and load receiving elements having parts interleaved in spaced relation to each other and in substantially the same plane, an elastomeric element fixed to each part of the load receiving element, an elastomeric element fixed to each part of the load transmitting element, said elastomeric elements cushioning motion in axial and radial directions, a member connected in load transmitting relation from each elastomeric element fixed to a part of a load receiving element to each elastomeric element fixed to a part of a load transmitting element, and means mounting said associated components on said member so the components contribute to the isolation of the equipment without increasing the overall weight.

References Cited by the Examiner

UNITED STATES PATENTS 2,689,464 9/1954 Wurtz _____ 248—358 X
2,912,212 11/1959 Lowe et al. _____ 248—358

FOREIGN PATENTS 223,695 10/1962 Austria.

CLAUDE A. LE ROY, *Primary Examiner.*

J. PETO, *Assistant Examiner.*